3,213,146
PHENOL FROM HALOAROMATICS

Walter H. Prahl, Buffalo, and Sol J. Lederman, Kenmore, N.Y., assignors to Hooker Chemical Corporation, Niagara Falls, N.Y., a corporation of New York
No Drawing. Filed Aug. 25, 1961, Ser. No. 133,802
10 Claims. (Cl. 260—629)

This invention pertains to the production of phenol and more specifically to the production of phenol by the vapor-phase catalytic hydrolysis of polychlorobenzene, or chlorophenol.

It is known that phenol can be produced by the hydrolysis of monochlorobenzene in vapor phase over catalysts, according to the overall reaction:

$$C_6H_5Cl + H_2O \rightarrow C_6H_5OH + HCl$$

The hydrolysis catalysts used in this reaction are oxides, hydroxides or salts of the elements of columns 1 to 4 of the periodic system. Examples of catalysts especially suitable are silicon dioxide, aluminum oxide and tricalcium phosphate. The catalytic activity of these catalysts can be increased by the use of compounds of copper, nickel and similar heavy metals as promoters, as described, for instance, in U.S. Patent 1,964,768.

If, instead of monochlorobenzene, the same reaction were applied to dichlorobenzenes, the formation of dihydroxybenzenes would be expected, which however, under prevailing conditions, would be expected to decompose, so that the vapor-phase hydrolysis of dichlorobenzenes would not be expected to lead to useful products.

Further, certain di-, tri-, and tetrachlorobenzenes have been in excess on the market at times. These polychlorobenzenes come from many sources. For instance, in the catalytic oxychlorination of benzene with HCl and air to form monochlorobenzene, certain quantities of dichlorobenzenes are produced as a by-product. Lesser amounts of tri-and tetrachlorobenzenes are also produced. Further, in the direct chlorination of benzene, polychlorobenzenes are produced as by-products for which there has been an insufficient market.

However, there has been an increasing market for phenol especially for use in the plastics field which has required further construction or expansion of plants for meeting this enlarging demand, as well as seeking other routes to the production of phenol.

Therefore, it is an object of this invention to provide a new method for the production of phenol.

Another object is to provide new starting materials for the production of phenol.

Still another object is to provide a method for converting the polychlorobenzenes and chloro phenols which are formed as undesirable by-products in several industrial processes into salable or useful products.

A further object is to provide a method of recovering the organic and chlorine content of polychlorobenzenes in a commercially useful form.

Other objects become apparent in the course of this description.

According to the present invention, we have unexpectedly found that if polychlorobenzenes or chlorophenols in vapor phase, together with water vapor, are passed over the catalysts conventionally used for the production of phenol from monochlorobenzene, phenol is formed. Although we do not wish to be limited to any theories except as defined in the appended claims, the overall reaction appears to be illustrated as follows:

$$C_6H_4Cl_2 + H_2O + H_2 \rightarrow C_6H_5OH + 2HCl$$

In other words, one of the chlorine atoms of the dichlorobenzene molecule appears to undergo hydrolysis in the expected form, but the other appears to be replaced by hydrogen in a hydrogenolysis, rather than by the expected hydroxyl group. The hydrogen is apparently formed in situ. This theory tends to be confirmed by our further discovery that if monochlorophenols are subjected to the same reaction conditions, the main reaction leads toward the formation of phenol by replacement of the chlorine with hydrogen, rather than with a hydroxyl radical.

We have found further that the conversion of polychlorobenzenes or chlorophenol to phenol can be carried out under essentially the same conditions under which the conventional and customary hydrolysis of monochlorobenzene is effected; that is, at temperatures between about 250 degrees centigrade up to about 600 degrees centigrade, with temperatures between about 400 degrees centigrade and 500 degrees centigrade being preferred.

The ratio of polychlorobenzene to water can vary within wide limits. When dichlorobenzene is used, the range of about one third to about four moles of dichlorobenzenes to one mole of water is preferred.

We have found that the yield, that is the percentage of phenol formed in relation to the quantity of starting material consumed in the reaction, decreases with increasing conversion. The term "conversion" herein is defined as the percentage of starting material fed into the reaction which reacts. The choice between a high yield of phenol at low conversion with larger equipment and larger consumption of utilities for a given production, or a lower yield of phenol at a higher conversion, with smaller equipment and less consumption of utilities for a given quantity of phenol, is a matter of economics. Our preferred range is between approximately eight percent and twenty-five percent conversion, but conversions outside of this range are technically and sometimes economically feasible.

The substances which can be used as starting materials in this invention are compounds having the structure:

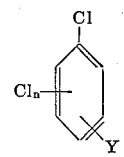

where Y is either a chloro-radical or a hydroxyl group, Cl is a chloro-radical and $n$ is an integer from zero to two. These compounds are ortho-, meta-, and para-dichlorobenzene, ortho-, meta-, and para-monochlorophenol, 1,2,3-, 1,2,4-, and 1,3,5-trichlorobenzene, 1,2,3,4-, 1,2,4,5-, and 1,2,3,5-tetrachlorobenzene, di- and trichlorophenol.

We have further found that the reaction according to this invention can be carried out simultaneously with the conventional hydrolysis of monochlorobenzene to phenol. For that purpose mixtures of monochlorobenzene, polychlorobenzene and/or chlorophenols can be passed, together with water in vapor form over catalysts to form phenol, rather than being separated from the monochlorobenzene and sold as by-products, as was done in the past.

The following examples are given to further illustrate our invention, but we do not wish to be limited to these except as defined in the appended claims. In each of the examples below the catalyst was contained in a two and one-half inch diameter steel pipe and kept at the reaction temperature by immersion in a fused salt bath.

Example 1

Six hundred and seventy-three grams of a five percent by weight mixture of ortho-chlorophenol in chlorobenzene and 394 grams of water were passed, as vapor, over 500 cubic centimeters of a tricalcium phosphate catalyst at about 420 degrees centigrade during a six hour period of time. The amounts of exit materials recovered showed that 0.178 mole of chlorobenzene and 0.197 mole of chlorophenol had reacted. Hydrochloric acid (0.3075 mole), and phenol (0.261 mole) were produced together with 0.042 mole of benzene.

Of the 1067 grams of liquid feed, 1062 grams of liquid products were recovered; in addition, 4050 cubic centimeters of gases were collected.

The comparison of the hydrogen chloride and phenol yields shows that 0.85 mole of phenol are formed per mole of hydrogen chloride, and 0.137 mole of benzene.

Example 2

Dichlorobenzene (946 grams), was passed, with water (305 grams) as vapor, over a catalyst consisting of silica gel impregnated with cupric chloride at 385 degrees centigrade over a period of four hours. All but 43 grams of the dichlorobenzene was recovered unreacted. Of the dichlorobenzene converted, 36 percent yielded ortho-chlorophenol, 8 percent phenol and 10 percent chlorobenzene.

Example 3

Ortho-chlorophenol (188 grams), and water (130 grams), were passed over a tricalcium phosphate catalyst at about 420 degrees centigrade. All but 0.237 mole of chlorophenol were recovered unreacted. There were produced 0.23 mole of hydrogen chloride, together with 0.183 mole of phenol, and 0.0275 mole of chlorobenzene. There were collected 4150 cubic centimeters of gas, and this together with the carbon deposited on the catalyst accounted for 0.0151 mole of chlorophenol. Therefore, of the unrecovered chlorophenol, the following percentages were converted to these products: phenol, 77.2 percent, chlorobenzene, 11.6 percent, and C, CO, $CO_2$, 6.4 percent.

Example 4

A solution containing 7.3 percent (by weight), of di- and higher-chlorobenzenes in monochlorobenzene was passed at the rate of 150 cubic centimeters an hour, with 60 cubic centimeters an hour of water over 500 cubic centimeters of tricalcium phosphate catalyst at 400 degrees centigrade. Of the dichlorobenzenes which reacted, 69.5 percent was converted to phenol, 12.3 percent to chlorophenols, 14 percent to benzene, and 4 percent to waste products.

Example 5

1,2,4,5-tetrachlorobenzene, (4254 grams), was passed, together with water (3710 grams), over a tri-calcium phosphate catalyst at about 400 degrees centigrade during a period of fifteen hours. The phenolic product consisted of 1.4 percent phenol, 3.6 percent 2,4,5-trichlorophenol, and 16 percent of 2,5-dichlorophenol. The non-phenolic material consisted of the original starting material (95 percent), and 1,2,4-trichlorobenzene (4.6 percent).

Example 6

During a period of six hours, 1542 grams of a mixture consisting of 8.6 percent dichlorobenzenes, 77.5 percent trichlorobenzenes, and 13.9 percent tetrachlorobenzenes were passed, with 360 grams of water, over a tricalcium phosphate catalyst at about 400 degrees centigrade. The products contained 3.85 grams of phenol, 29.68 grams of chlorophenol, 2.81 grams of dichlorophenol, and 0.67 gram of tar.

From a consideration of the above examples, especially Examples 1 and 4, it is clear that this invention can be particularly useful in the so-called Raschig-phenol process for the reaction of benzene in a first chlorination stage using hydrogen chloride and air to produce chlorobenzene followed by a second hydrolysis stage to hydrolyze the chlorobenzene to phenol. With this invention, the polychlorobenzenes formed as by-products in the first stage and the chloro phenols formed as by-products in the second stage, which by-products were up until now not usable in the process, can be used as feed to the second stage and converted to phenol, and thereby increase the overall yield of phenol and reduce the amount of by-products.

Various modifications can be made to our examples and disclosure, without departing from the scope of our invention, and we do not wish to be limited hereto except as defined in the appended claims.

We claim:

1. In the continuous process for the production of phenol by the oxychlorination of benzene to monochlorobenzene and polychlorobenzene in a first chlorination stage, followed by the hydrolysis in a second stage of monochlorobenzene with steam to phenol and HCl in vapor phase over a tricalcium catalyst therefore at a temperature between about 250 and about 600 degrees centigrade, the improvement which comprises introducing as feed to the said second stage said polychlorobenzenes along with the monochlorobenzene, whereby phenol ($C_6H_5OH$) is produced from the said polychlorobenzenes as well as from the monochlorobenzene.

2. The process according to claim 1 wherein the feed to the said second stage consists essentially of steam, monochlorobenzene and dichlorobenzene.

3. In the continuous process for the production of phenol by the oxychlorination of benzene to monchloro-benzene and polychlorobenzenes in a first chlorination stage, followed by the hydrolysis in a second stage of monochlorobenzene with steam to phenol and HCl in vapor phase over a tricalcium phosphate catalyst therefor at a temperature between about 250 and about 600 degrees centigrade, the improvement which comprises introducing as feed to the said second stage said polychlorobenzenes and a chlorophenol containing from one to three chlorine atoms along with the monochlorobenzene, whereby phenol ($C_6H_5OH$) is produced from the said polychlorobenzenes and chlorophenol as well as from the monochlorobenzene.

4. The process according to claim 3 wherein the feed to the said second stage consists essentially of steam, monochlorobenzene, dichlorobenzene and chlorophenol.

5. The process according to claim 3 wherein the feed to the said second stage consists essentially of steam, monochlorobenzene dichlorobenzene, trichlorobenzene and a chlorophenol containing from one to three chlorine atoms.

6. The process for the production of phenol which comprises passing in the vapor phase materials consisting essentially of water, monochlorobenzene and polychlorobenzene at a temperature between about 250 and about 600 degrees centigrade in the presence of a tricalcium phosphate catalyst, the mole ratio being from about one-third to about four moles of said monochlorbenzene and polychlorobenzene per mole of water, whereby phenol ($C_6H_5OH$) is produced from said polychlorobenzene as well as from said monochlorobenzene.

7. The process for the production of phenol which comprises passing in the vapor phase materials consisting essentially of water, monochlorobenzene, a chlorophenol containing from one to three chlorine atoms, and polychlorobenzene at a temperature between about 250 and 600 degrees centigrade in the presence of a tricalcium phosphate catalyst, the mole ratio being about one-third to about four moles of said monochlorobenzene, chlorophenol and polychlorobenzene per mole of water, whereby phenol ($C_6H_5OH$) is produced from said chlorophenol and polychlorobenzene as well as from said monochlorobenzene.

8. A process for the production of phenol which comprises passing in the vapor phase compounds consisting essentially of water and material having the structure:

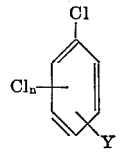

where Y is selected from the group consisting of a chloro-radical and a hydroxyl group, and $n$ is an integer from zero to two, at a temperature between about 250 and 600 degrees centigrade in the presence of a tricalcium phosphate catalyst, the mole ratio of said material being from about one-third to about four moles per mole of water, whereby phenol ($C_6H_5OH$) is so produced.

9. A process according to claim 8 wherein the said material is polychlorobenzene.

10. A process according to claim 8 wherein the said material is a chlorophenol containing from one to three chlorine atoms.

References Cited by the Examiner

UNITED STATES PATENTS

| 1,849,844 | 3/32 | Lloyd et al. | 260—623 X |
| 1,966,281 | 7/34 | Bertsch | 260—629 |
| 2,766,295 | 10/56 | Gleim | 260—621 |
| 2,803,669 | 8/57 | Brainerd et al. | 260—621 |

FOREIGN PATENTS

| 575,229 | 5/59 | Canada. |

LEON ZITVER, *Primary Examiner.*

CHARLES B. PARKER, *Examiner.*